United States Patent [19]
Kolm

[11] 3,970,987
[45] July 20, 1976

[54] ACOUSTICAL SWITCH

[75] Inventor: Eric A. Kolm, Brookline, Mass.

[73] Assignee: Signal Science, Inc., Holliston, Mass.

[22] Filed: May 31, 1974

[21] Appl. No.: 474,875

Related U.S. Application Data

[63] Continuation of Ser. No. 281,420, Aug. 17, 1972, abandoned, which is a continuation-in-part of Ser. No. 225,230, Feb. 10, 1972, abandoned.

[52] U.S. Cl............................. 340/15; 340/171 R; 340/16 C; 340/310 R; 353/122
[51] Int. Cl.².................................... H04B 11/00
[58] Field of Search................ 340/15, 171 R, 16 C, 340/310 R; 325/37; 307/315; 178/DIG. 15; 353/105, 106, 122

[56] References Cited
UNITED STATES PATENTS

| | | |
|---|---|---|
| 3,199,070 | 8/1965 | Baier, Jr. .................. 340/15 |
| 3,423,725 | 1/1969 | Harwood .................. 340/15 |
| 3,471,846 | 10/1969 | Cotter ...................... 340/15 |
| 3,548,116 | 12/1970 | Schafft ................ 310/8.3 UX |
| 3,590,271 | 6/1971 | Peters ..................... 340/171 |
| 3,675,226 | 7/1972 | Long ................... 340/171 R |

Primary Examiner—Maynard R. Wilbur
Assistant Examiner—T. M. Blum
Attorney, Agent, or Firm—Cesari and McKenna

[57] ABSTRACT

An acoustical switch is actuated from a remote location by a sound generator such as an ultrasonic whistle. The switch includes a special tuned signal receiver coupled with an amplifier having a frequency selective feedback network. The output of the amplifier is an a.c. signal which is applied to a bistable circuit which, in one state, energizes a relay to turn on an appliance connected to the switch and, in its other state, turns the appliance off.

18 Claims, 3 Drawing Figures

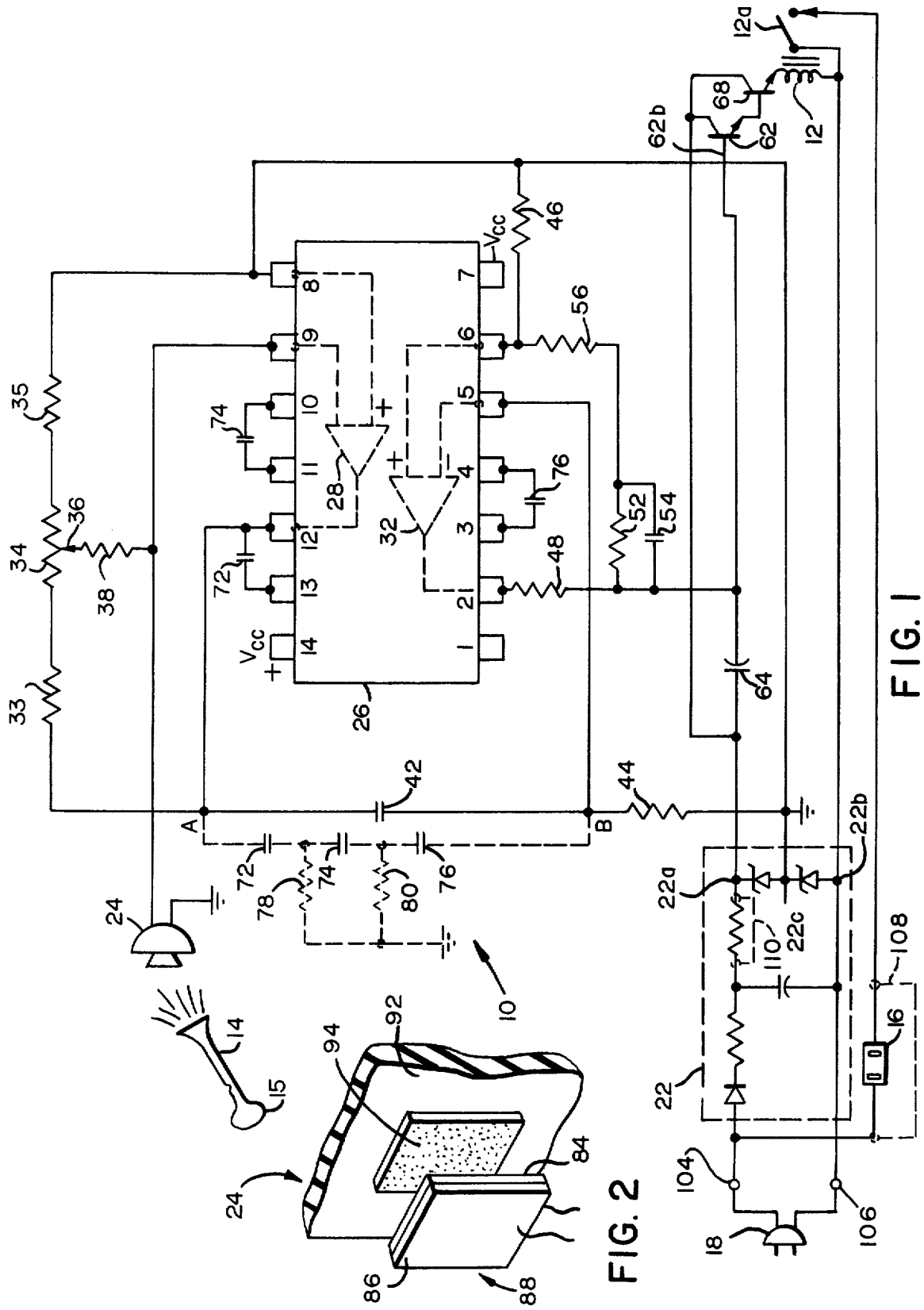

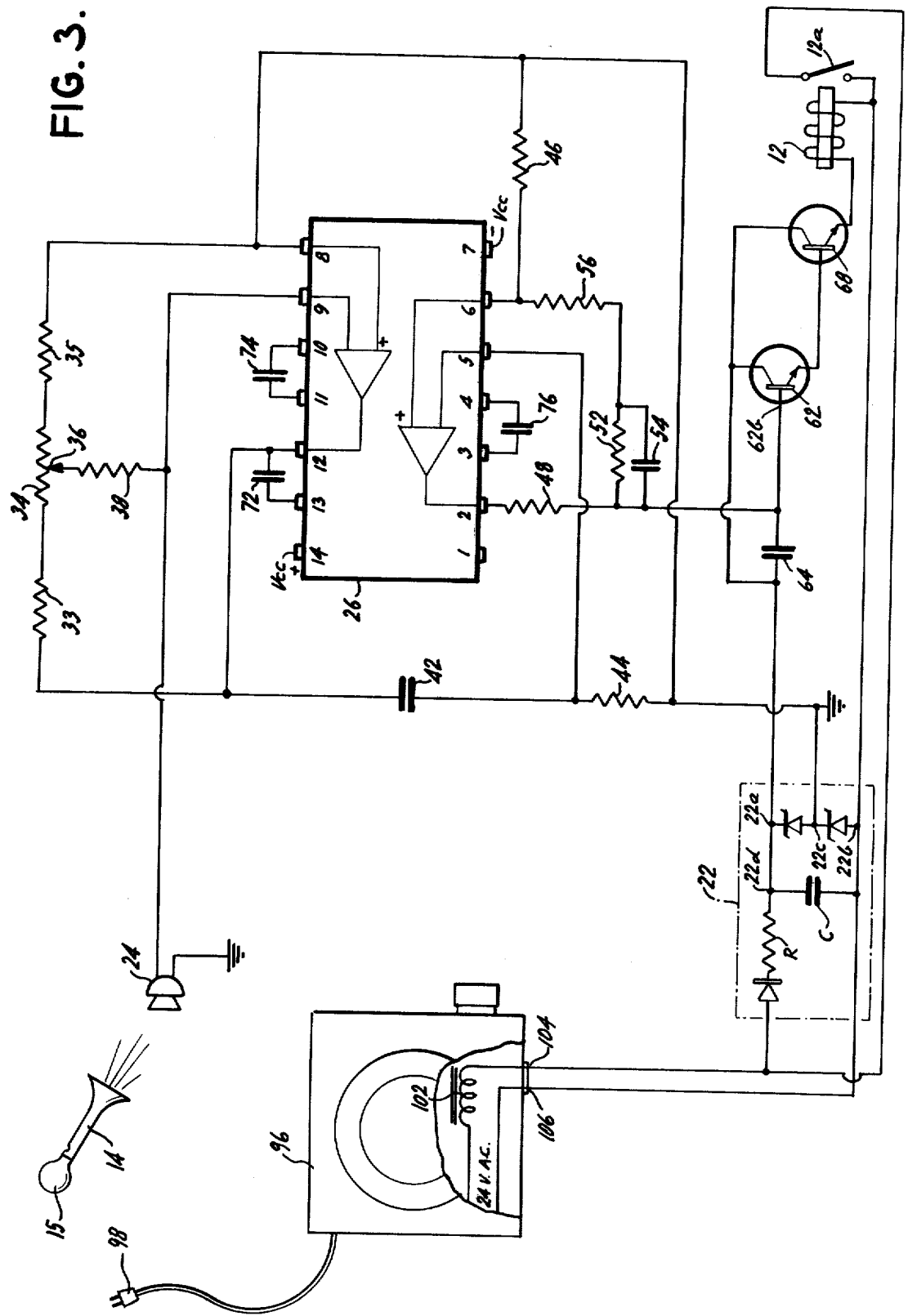

ACOUSTICAL SWITCH

RELATED APPLICATION

This is a continuation of application Ser. No. 281,420, filed Aug. 17, 1972, now abandoned, which in turn is a continuation-in-part of application Ser. No. 225,230, now abandoned, filed Feb. 10, 1972, entitled Acoustical Switch.

BACKGROUND OF THE INVENTION

1. Field of Invention

This invention relates to an acoustical switch. More specifically, it relates to a switch which may be closed or opened in response to inaudible blasts on an ultrasonic whistle. The invention is particularly suitable for remotely operating electrical devices, such as household appliances, automatic slide projectors and the like, all of which are controllable by means of electric switches or like components.

2. Prior Art

Remote control systems for electrically operated devices may be generally classified in two types, namely, wired and wireless systems. The wired systems have the obvious disadvantage of relative inflexibility with regard to change of position of either the controlled device or the source of the control signals. As a result, a number of wireless systems have been developed for household use. Among these are the radio frequency systems used for remote control of garage doors from automobiles and the acoustical systems used to control the operation of television sets.

These prior devices have suffered mainly from two deficiencies. First is their relatively high cost. Moreover, they require a special transmitter to be carried by the person who desires to exert control over the system. This transmitter, although portable, is often bulky and, furthermore, represents a substantial item of cost. This latter cost factor is, of course, magnified when independent control by two or more persons is desired.

A principal obstacle against simplifying the transmitter has been the requirement for using signals that are materially different from spurious background signals which might be present in the environment in which the switch is situated. These spurious signals have a tendency to exert unwanted control over the switch.

The prior art devices for remote control of appliances connected to power lines or other fixed and nonportable power supplies cannot be used away from such power sources. Furthermore, the circuits of some of these prior devices are electrically quite complex, which prevents their use in an environment where shocks and vibrations are present.

We are also aware of a remotely actuatable switch that responds to acoustical signals in the upper audible or lower ultrasonic region. However, this requires an expensive, fragile receiving microphone and is not suitable for rugged use. The present invention is directed toward a switch operating on somewhat similar principles, but which is more rugged and simpler to make. These attributes are particularly important if the switch is to be a reliable, low-cost consumer item.

SUMMARY OF THE INVENTION

Accordingly, a principal aim of the present invention is to provide a wireless remote control system which is characterized by relatively simple circuitry and low cost.

A further object of the invention is to provide a remote control system of the above type which responds to a simple, low-cost acoustical transmitter, and yet which is essentially free from operation by relatively short spurious signals.

Another object of the invention is to provide an acoustical switch which responds to a transmitter which is small and which does not require electrical power of its own.

Another object of the invention is to provide a remote control system which is nondirectional in that it responds to acoustical signals originating from around corners and behind furniture.

Still another object of the invention is to provide an acoustical switch which is small and compact and, therefore, inconspicuous when positioned near the appliance it is controlling.

A further object is to provide an acoustical switch having a low cost, rugged receiving transducer system which optimizes switch performance.

Another object of the invention is to provide an acoustical switch especially suited for actuating an automatic movie slide projector.

Yet another object is to provide a sound responsive slide projector.

Other objects of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

In one illustrative example of the invention, an acoustic remote control device which is responsive to acoustic and remotely-generated signals in a predetermined frequency range is adapted to be coupled to an auxiliary device to control the operation of the auxiliary device. The remote control device includes a tuned transducer which is responsive to the acoustic signals. A control means is coupled to receive input from the tuned transducer and produces a control signal in response to received acoustic signals. The control means includes conditioning means responsive to the control signals which conditions the control means for response to acoustic signals received after the occurrence of said control signal. The device also has means adapted to couple the control signal to the auxiliary device for controlling the functioning of the auxiliary device.

The invention makes use of acoustical control signals such as may be produced by blowing a practically inaudible, ultrasonic whistle similar to the type used to call dogs, but operating at a higher frequency, e.g. 13kHz instead of 7–8 kHz. If desired, a squeeze bulb may be attached to the whistle so that the whistle can be blown simply by squeezing the bulb.

These acoustical signals are picked up by the special tuned transducer in the system to be described later and then amplified by a frequency selective amplifier. The output of the amplifier is an a.c. signal which is applied to a special bistable circuit also to be described in detail later operated to switch an auxiliary device on and off in response to successive blasts on the whistle. The invention can also be utilized to control more complex auxiliary devices such as automatic garage doors and automatic slide projectors.

The system is designed to respond to those signals in a relatively narrow frequency band embracing the high frequency control signals from the whistle. This reduces the chances of the system being affected by spurious acoustical signals and noise. The bistable circuit also helps to make the switch relatively immune to noise. This is because it is arranged so that it does not tend to respond to intermittent or "stuttering" types of acoustical signals which may have components of the right frequency, but which originate from other sources, e.g. rattling keys.

The electrical components of the subject switch are in a large part embodied in a single, monolithic, integrated circuit which is very small, rugged and reliable and relatively inexpensive. Therefore, the acoustical switch as a whole possesses these same attributes to a great extent.

BRIEF DESCRIPTION OF THE DRAWING

For a fuller understanding of the nature and objects of the invention, reference should be had to the following detailed description taken in connection with the accompanying drawing, in which:

FIG. 1 is a schematic diagram of an acoustical switch embodying the invention;

FIG. 2 is a fragmentary exploded perspective view showing the transducer in the FIG. 1 circuit in greater detail, and FIG. 3 is a schematic and diagrammatic representation of the acoustic switch of this invention connected to control the operation of a slide projector.

Referring now to FIG. 1 of the drawing, the present system comprises a receiver indicated generally at 10 having a relay 12 whose contact 12a is opened or closed in response to signals from an acoustical transmitter 14. This transmitter in the present illustration is a whistle that emits a blast in the lower ultrasonic region when an attached bulb 15 is squeezed. Typically, its signal has a center frequency of 13 kHz and a bandwidth of 5 kHz.

Relay contact 12a is connected in series with a conventional female electrical outlet 16 and a conventional male plug 18, the latter being arranged to fit a typical female wall outlet (not shown).

Receiver 10 includes a conventional d.c. power supply 22 which is connected to the male plug 18 so that a d.c. potential exists across its output terminals 22a and 22b. The receiver detects the acoustical signals from transmitter 14 by means of a special tuned acoustical receiving transducer 24 to be described in detail later. The transducer generates an alternating current output in response to the whistle which is applied to a monolithic dual operational amplifier indicated at 26. A dual amplifier such as this is sold by Transitron Electronic Corporation, Wakefield, Mass., under its designation TOA2809. The monolithic amplifier is shown in detail in Transitron's Product Data Sheet No. 1-501.

Basically, it is comprised of a pair of operational amplifiers indicated at 28 and 32. The output of transducer 24 is applied as the inverting input to terminal No. 9 leading to one input terminal of amplifier 28. The output of the amplifier 28 appearing at terminal No. 12 is coupled back through a resistor 33, a potentiometer 34 and a resistor 35 and is applied as the noninverting input to terminal No. 8 leading to the other input terminal of amplifier 28. Amplifier 28 thus has a relatively high gain which can be varied as needed by means of an adjustable tap 36 on potentiometer 34. This tap 36 is connected by way of a resistor 38 to the amplifier terminal No. 9 and to the center tap 22c of the power supply, this being electrical ground. Thus, when the switch is employed in a relatively quiet environment, potentiometer 34 may be adjusted to increase the sensitivity of the device and thereby extend the distance range over which transmitter 14 is effective to actuate the switch. Conversely, in a noisy environment, the gain can be lowered to minimize false triggering of the switch.

The a.c. signal from amplifier 28 is also coupled by way of a capacitor 42 as the inverting input to terminal No. 5 leading to one input terminal of amplifier 32. Terminal No. 5 is also connected by way of a resistor 44 to the center tap 22c of the power supply and terminal No. 6 is connected to the same point by way of a resistor 46.

The output of amplifier 32 appearing at terminal No. 2 is applied as the noninverting input to terminal No. 6 by way of a series network composed of (1) a resistor 48, (2) a tank circuit including resistor 52 and capacitor 54, and (3) an additional resistor 56, the resistors providing a voltage dividing network. The amplifier output at terminal No. 2 is also applied to the base 62b of a transistor 62, the base also being connected by way of an isolating electrolytic capacitor 64 to the power supply terminal 22a.

Transistor 62 is one of a pair of transistor 62, 68 connected in a Darlington configuration. The collectors of both transistors are connected to power supply terminal 22a and, as usual in this arrangement, the emitter of transistor 62 is connected to the base of transistor 68. The transistor 68 emitter, on the other hand, is connected to one end of relay coil 12, the other end of which leads to the power supply terminal 22b. Transistor 62 and 68 are turned on and off together by the presence and absence, respectively, of a selected voltage level at the base of the former. When the transistors are conducting, the coil of relay 12 is energized, thereby closing contact 12a and turning on an appliance plugged into receptacle 16. Conversely, when the transistors are not conducting, the relay coil is deenergized and the appliance is turned off.

The monolithic dual amplifier is provided with the usual positive and negative supply voltages $V_{cc}$ and $-V_{cc}$ at its terminal Nos. 14 and 7, respectively. These may be obtained conveniently from power supply 22. In addition, suitable capacitors 72 and 74 and 76 are included between terminals Nos. 10 and 11 and between terminals Nos. 3 and 4, respectively, to provide frequency compensation.

Typical characteristics of the various circuit components are listed as follows:

| | |
|---|---|
| resistor 33 | 10K |
| potentiometer 34 | 10K |
| resistor 35 | 108 ohm |
| resistor 38 | 470K |
| resistor 44 | 100K |
| resistor 46 | 100K |
| resistor 48 | 275K |
| resistor 52 | 8.2M |
| resistor 56 | 1.0M |
| capacitor 42 | 100PFD |
| capacitor 54 | 0.fMFD |
| capacitor 64 | 2.2MFD 50VDC Electrolytic |
| capacitor 72 | 5PFD |
| capacitor 74 | 10PFD |
| capacitor 76 | 200PFD |
| transistors 62 & 68 | 2N3567 |
| relay 12 | 1000 ohm 10V |

The amplifier 32 and the elements in its feedback loop comprise a bistable circuit which has a "memory".

When this circuit is in one state, a positive voltage is applied to the base of transistor 62 which is sufficient to turn on the transistor, causing relay contact 12a to close. When the circuit is in its other state, a lesser voltage is applied to the base of transistor 62 so that the transistor does not conduct and relay contact 12a remains open. The circuit is switched back and forth between its two stable states in response to an alternating signal applied to the input of amplifier 32 through terminal No. 5 when the transducer 24 detects a signal from transmitter 14. In other words, similar or identical alternating electrical signals coupled from amplifier 28 turn the present switch both on and off.

For purposes of discussion, assume at the outset that the noninverting input voltage at terminal No. 6 exceeds the input voltage at terminal No. 5. Under these circumstances, the output of amplifier 32 is the positive difference voltage multiplied by the gain of the amplifier. Resistors 48, 52, 56 and 46 comprise a voltage dividing network so that a fraction of that positive voltage appears at terminal No. 6. Thus, in the absence of signals applied to the inverting input terminal No. 5, the circuit remains in this stable condition so that a positive voltage is applied to the base 62b of transistor 62 sufficient to turn on the transistor, with the result that relay contact 12a remains closed.

Assume now that transmitter 14 emits a whistle blast. This blast is detected by transducer 24, giving rise to an a.c. signal which is applied to the inverting input of amplifier 32 at terminal No. 5. During the positive half-cycle of the applied a.c. signal, the voltage at terminal No. 5 exceeds that of terminal No. 6. Consequently, the output from amplifier 32 becomes negative. This negative voltage is immediately coupled back via resistors 48 and 56 to terminal No. 6. This causes the noninverting input voltage to the amplifier to drop, which tends to drive the amplifier output negative even more quickly to saturation.

It should be mentioned that the presence of capacitor 54 effectively shorts out the relatively large resistor 52 so that the switching of the output of the amplifier is almost immediately reflected by a change in the voltage applied to terminal No. 6. In fact, the circuit should and does respond in a fraction of a half-cycle of the a.c. signal applied to terminal No. 5.

The negative output voltage from amplifier 32 causes the voltage applied to the base of transistor 62 to drop sufficiently to cut off the transistors 62 and 68 so that relay contact 12a opens.

In addition to increasing the response time of the circuit in response to the positive half-cycle of the incoming signal, capacitor 54 also desensitizes the circuit so that the following negative half-cycle of that signal does not cause the output of amplifier 32 to change back again, thereby turning on the switch.

More particularly, after the amplifier output goes negative, a relatively large negative voltage is maintained at terminal No. 6 until the charge impressed on capacitor 54 discharges through resistor 52. Accordingly, the negative swing of the a.c. input signal at terminal No. 5 is not enough to drive the amplifier output sufficiently positive to turn on transistor 62.

Transistor 62 will remain cut off and the switch turned off until another blast from transmitter 14 is detected by the transducer. When that happens, upon the occurrence of a negative half-cycle of the incoming signal, the voltage at terminal No. 5 is brought well below that of terminal No. 6. Consequently, the output voltage of amplifier 32 again becomes positive so that transistors 62 and 68 are turned on, thereby closing relay contact 12a. Again, the circuit becomes desensitized until the charge on capacitor 54 leaks off through resistor 52, so that the succeeding positive half-cycle of the incoming signal do not recycle the switch. In this fashion, the present switch can be turned on and off by successive spaced-apart signals from transmitter 14.

The inclusion of resistor 48 and capacitor 64 (along with resistor 46, 52 and 56 and capacitor 54) makes the present switch even less responsive to spurious acoustical signals and noise. More particularly, very short noise spikes which are passed by amplifier 32 are attenuated by resistor 48 and shorted to ground through capacitor 64 and the Zener diode between power supply terminals 22a and 22c. Thus, the voltage level from amplifier 32 must be of sufficient duration to charge capacitor 64 and raise the voltage applied to the transistor base 62b to a point sufficient to turn on the transistor.

The signal duration required to actuate the switch may be altered by changing the time constant of this circuit. Thus, the switch can be made to have a selected immunity to ambient noise. For example, one may increase the required time duration to several seconds so that transient or intermittent sounds even of the right frequency do not affect the switch. By the same token, one can select the value of these components so that the circuit becomes monostable. Upon receiving a signal from transducer 24, the output circuit will switch to its opposite state and remain there for a selected time before returning to its original state.

In other words, the switch can be made to turn on for a determined time and then turn off with one signal. In this mode, the switch can operate motorized garage doors and camera shutters including associated lighting equipment, for example. Of course, in this event, the relay contact 12a is connected to act as a simple series switch.

Even further spurious noise rejection may be attained by substituting for capacitor 42 the high pass filter indicated in dotted lines in FIG. 1. The filter is composed of three capacitors 72, 74, 76 connected in series between terminal No. 12 and resistor 44 and a pair of resistors 78 and 80, each connected between ground and capacitor 74 on opposite sides thereof. For example, with 300 pfd capacitors and 100K resistors, the filter has a 2 kHz bandwidth and a Q of about 6 at 13 kHz.

The Darlington pair 62, 68 are employed in order to equalize the load on amplifier 32 when the switch is being turned on and when it is being turned off. In other words, if only the one transistor 68 were employed, the amplifier would see a greater load when the transistor 68 is turned on due to the presence of relay coil 12 than when the transistor is turned off. Therefore, the switch would respond differently to the incoming signals, depending upon whether it is on or off.

Turning now to FIG. 2, transducer 24 is specially designed for ruggedness, reliability and low cost, unlike conventional microphones. Moreover, it has an especially high output and is easily tunable so that it responds only to the frequency of the blasts from transmitter 14.

The transducer is composed of a pair of piezo-electric ceramic elements 84 and 86 cemented together face-to-face to form a bimorph 88. The bimorth 88 vibrates in the flexural mode so that the outputs of the two elements are additive. These bimorphs are widely used in ceramic phonograph cartridges so that they are readily available at low cost. However, normally these are designed to have a flat response in the audio range. Here, however, the dimensions of the bimorph are calculated so that the bimorph has a natural resonance in the immediate vicinity of the frequency of the signals from transmitter 14.

Then the bimorph is fine-tuned simply by either increasing its mass slightly with solder drops or decreasing its mass by clipping off ceramic material. The tuning is accomplished while the bimorph is activated by a signal generator and its response is continuously monitored on a scope. Thus, the tuning is fast, accurate and inexpensive and the result is very inexpensive, accurate, resonant microphone which amplifies the desired signal so that the switch does not respond to off-frequency signals which are down several db's. The bimorph also is a high impedance device which makes it particularly suitable for use with the illustrated switch circuitry.

In use, the bimorph 88 is secured to the underside of the printed circuit board 92 carrying the switch electronics remote from the relay 12 and other components which could produce feedback. A strip 94 of double-faced adhesive sponge tape is used to adhere the bimorph to the board. The durometer of tape 94 is low enough so that it absorbs vibrations in the audio range and optimizes the response of the transducer at the desired frequency, e.g. 13 kHz. Furthermore, the mount is rugged, yet simple and inexpensive.

As described above, the acoustic remote control device is arranged to control the power to an auxiliary device coupled to the switch. It is often desirable and advantageous to remotely control more complex functions of the device such as the automatic slide changing function of a slide projector. The typical slide projector, such as a Kodak Carousel projector, or the like, is arranged to automatically change slides in response to a control signal. Typically, the control signal activates a solenoid in the slide projector which in turn activates the slide changing mechanism in the projector to automatically cycle through a complete slide changing cycle during which the slide to be viewed is changed. In accordance with this invention, the acoustic remote control device is coupled to the slide projector so that the slide changing function can be performed from a remote location requiring no wires between the remote location and the projector.

Referring now to FIG. 3, there is shown a representation of a typical slide projector, 96 arranged to be remotely operated by the acoustic remote control device of this invention. The slide projector includes an electrical plug 98 adapted to be inserted into a conventional source of power, such as a wall outlet. The projector has internal circuitry for converting the power obtained from the conventional power source into a 24 volt ac supply for solenoid 102. The solenoid is arranged to activate the slide changing mechanism (not shown) in the projector as is well known in the art. In a typical operation, terminals 104, 106 are connected together by activation of an external push button switch, coupled across the terminals which, in turn, activates solenoid 102 and the slide changing mechanism in the projector. According to the invention, an acoustic switch is provided for remotely controlling the operation of the solenoid and slide changing mechanism in the projector. The acoustic switch is preferably modified to be operable from the 24 volt ac supply from the slide projector by removal of the resistor coupled between terminals 22a and 22d, changing the resistance of R to 1.5 Kohm and the capacitance of capacitor C to 500 mfd and eliminating connectors 16.

When the projector is turned on initially, the switch is always in the OFF position due to the presence of the large filter capacitor in the power supply 22. When the operator wishes to change a slide in the projector he activates whistle 14. The sound is picked up by transducer 24 whereupon switch contact 12a closes as described above. Terminals 104 and 106 are now connected with the result that the projector solenoid 102 is energized effecting the slide change.

The closing of switch contact 12a also short circuits the power supply 22 so that the switch is deenergized. After the slide changing mechanism has completed its cycle, power is again supplied to supply 22 so that the switch again is in its OFF position awaiting the next slide change signal from whistle 14.

As seen from the foregoing, then, the present acoustical switch responds reliably to acoustical signals even from a relatively great distance. Yet, it is not responsive to transient signals or noise that might otherwise tend to operate the switch at the wrong time. Furthermore, the unit includes provision for accommodating the switch to different noise environments so that its performance can be optimized. Still, with all of these advantages, due to its simple, unique construction, the cost of manufacturing the switch is relatively low as compared with prior comparable devices of this type.

It will thus be seen that the objects set forth above, among those made apparent from the preceding description, are efficiently obtained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:
1. An acoustical switch comprising
   A. an acoustical transducer for converting sounds into AC signals,
   B. an amplifying circuit connected to amplify a selected band of AC signals received from said transducer in the upper audible or ultrasonic frequency range,
   C. means for connecting said switch to a power source, and
   D. a switching circuit
      1. operative in response to the AC output of said amplifying circuit, and
      2. arranged to alternately connect said power source to and disconnect it from an appliance upon the occurrence of successive outputs from said transducer, said switching circuit including
         a. an operational amplifier,
         b. means for applying the AC signal to one input of the amplifier,
         c. means for coupling the output voltage of the amplifier to another input thereof so that the output voltage tends to fluctuate with the a.c. signal, and
         d. means associated with the amplifier for temporarily desensitizing the switching circuit during selected half-cycles of the AC signal so that the amplifier output voltage remains substantially at the value it first changed to on commencement of the AC signal.

2. The acoustical switch defined in claim 1
   A. wherein the amplifier circuit has relatively high gain, and
   B. further including means for adjusting said gain.

3. The acoustical switch defined in claim 1 wherein the amplifier circuit and switching circuit are comprised of a single monolithic dual operational amplifier.

4. The acoustical switch defined in claim 1 and further including
   A. a whistle which emits an acoustical signal in said range when blown, and
   B. means associated with the whistle for blowing it.

5. The acoustical switch defined in claim 1 wherein the switching circuit also includes an electronic switch which is turned on when the amplifier output voltage is at one extreme of its fluctuation and is turned off when that voltage is at the other extreme of its fluctuation.

6. The acoustical switch defined in claim 5 wherein the electronic switch includes a pair of transistors connected in a Darlington configuration with the amplifier output voltage controlling the voltage at the base of the first transistor.

7. The acoustical switch defined in claim 5 and further including means in circuit with the amplifier for shunting to ground transient output signals from the amplifier so that the switch is only responsive to acoustical signals of a predetermined duration.

8. The acoustical switch defined in claim 1 wherein the desensitizing means includes a parallel-connected resistor and capacitor in the coupling means which holds the other amplifier input beyond a selected voltage level until the charge produced on the capacitor when the amplifier output changes discharges through the resistor so that the switch cycles only in response to acoustical signals which are spaced apart in time by a selected time interval.

9. The acoustical switch as defined in claim 8 and further including a low pass filter connected between the transducer and the operational amplifier to eliminate ambient noise spikes.

10. The acoustical switch as defined in claim 8 and further including means for altering the resistance and/or capacitance of the coupling means to alter the time constant of the switching means.

11. The acoustical switch as defined in claim 10 and wherein the time constant is selected so that the switching circuit is monostable.

12. An acoustical switch comprising
   A. a piezoelectric transducer tuned to a selected frequency in the upper audible or lower ultrasonic frequency range so as to produce a strong AC signal when acoustically excited at that frequency,
   B. high gain amplifying circuit connected to amplify the AC signal from the transducer,
   C. means for connecting the switch to a power source,
   D. means for connecting said switch to a power consuming device, and
   E. a switching circuit,
      1. operative in response to the AC output of said amplifying circuit, and
      2. arranged to connect the power source to the device upon the occurrence of a first said signal, said switching circuit including
         a. an amplifier,
         b. means for applying the AC signal as one input to the amplifier,
         c. means for applying the amplifier output as another input to the amplifier, and
         d. means associated with the amplifier for temporarily desensitizing the switching circuit during selected half-cycles of the AC signal so that the amplifier output voltage remains substantially at the value it first changed to upon commencement of the AC signal.

13. The switch defined in claim 12 wherein the switching circuit is also arranged to alternately connect the power source to and disconnect it from said device upon the occurrence of successive said acoustical signals.

14. The switch defined in claim 12 wherein the switching circuit has a selected time constant so that the switch connects the power source to the device only for the selected period of time following the first acoustical signal.

15. The acoustical switch defined in claim 12 wherein the transducer comprises a piezoelectric ceramic bimorph tuned to a frequency in the upper audible or lower ultrasonic range, said bimorph producing a relatively strong AC signal when excited by said frequency.

16. The acoustical switch defined in claim 15 wherein the bimorph is arranged to vibrate in the flexural mode.

17. The acoustical switch defined in claim 15 and further including
   A. a stationary base,
   B. a flexible resilient pad, and
   C. means for securing the bimorph flush against the pad and the pad flush against the base.

18. The acoustical switch defined in claim 17 wherein the pad is a strip of double-faced adhesive foam tape.

* * * * *